(12) United States Patent
Mauze et al.

(10) Patent No.: US 6,933,026 B2
(45) Date of Patent: Aug. 23, 2005

(54) METHOD TO REDUCE DAMAGE CAUSED BY IRRADIATION OF HALOGENATED POLYMERS

(75) Inventors: Ganapati Mauze, Sunnyvale, CA (US); Nikhil Trilokekar, Fremont, CA (US)

(73) Assignee: Aradgim Corporation, Hayward, CA (US)

( * ) Notice: Subject to any disclaimer, the term of this patent is extended or adjusted under 35 U.S.C. 154(b) by 124 days.

(21) Appl. No.: 10/360,568

(22) Filed: Feb. 6, 2003

(65) Prior Publication Data

US 2004/0157017 A1 Aug. 12, 2004

(51) Int. Cl.⁷ .................................................. B32B 1/02
(52) U.S. Cl. ........................ 428/35.7; 428/345; 428/421
(58) Field of Search ................................ 428/35.7, 345, 428/421

(56) References Cited

U.S. PATENT DOCUMENTS

| | | |
|---|---|---|
| 4,280,497 A | 7/1981 | Warner et al. |
| 5,497,763 A | 3/1996 | Lloyd et al. |
| 5,544,646 A | 8/1996 | Lloyd et al. |
| 5,709,202 A | 1/1998 | Lloyd et al. |
| 5,718,222 A | 2/1998 | Lloyd et al. |
| 5,827,904 A | 10/1998 | Hahn |
| 5,881,534 A * | 3/1999 | Ahlqvist et al. ............. 53/403 |
| 6,007,529 A | 12/1999 | Gustafsson et al. |
| 6,123,068 A | 9/2000 | Lloyd et al. |
| 6,468,258 B1 | 10/2002 | Shang |

FOREIGN PATENT DOCUMENTS

JP    2002114921 A    4/2002

* cited by examiner

Primary Examiner—Sandra Nolan Rayford
(74) Attorney, Agent, or Firm—Karl Bozicevic; Bozicevic, Field & Francis LLP (57) ABSTRACT

A method for producing a polymeric film resistant to degradation during sterilization such as gamma irradiation is presented. The method includes the steps of minimizing the number of free radicals formed during sterilization through use of an inert gas and a reactant scavenger within a sterilization pouch, which reactant scavenger may be acid adsorbents which scavenge the acid by-products formed during irradiation. The films retain physical and mechanical properties with long-term storage. The films are particularly amenable for use as packaging laminates in pharmaceutical, food, semiconductor and medical device industries.

22 Claims, 1 Drawing Sheet

METHOD TO REDUCE DAMAGE CAUSED BY IRRADIATION OF HALOGENATED POLYMERS

FIELD OF THE INVENTION

The invention relates to the field of packaging and specifically to reducing damage to package materials caused by radiation to sterilize.

BACKGROUND OF THE INVENTION

The environmental conditions under which irradiation of polymeric devices and packaging films is conducted can significantly affect the properties of the polymer. Such irradiation of the polymers could be employed for sterilization, as is common in the medical and pharmaceutical industry, as well as for structural modification of polymer such as cross-linking. The presence of oxygen or air during irradiation may produce free radicals; radiation may also break bonds generating new reactive species such as HF, HCl, F−, Cl− from the polymer constituents. The effect of these radicals depends on the nature of the irradiated polymer, the presence of additives, and other parameters such as temperature, total dose, dose rate, and duration of the exposure of the reactive species. The term reactive species is used to indicate both the free radicals as well as other reactive species formed due to the effects of irradiation. These reactive species can cause chain scission reactions, in which the long backbone chains as well as side chains are cut, resulting in a loss of the molecular weight of the polymer along with changes to its structural properties. From a product use standpoint, the loss of desirable mechanical properties is one of the most important characteristics affected by irradiation of polymers. In the case of chlorofluoropolymers such as PCTFE used in packaging and barrier films, the release of byproducts such as low levels of HF, HCl and possibly other organic chlorofluorocarbons is also a matter of concern because they react with and have adverse effects on the barrier and structural properties of the packaging components as well as the packaged product itself.

To avoid oxidation, manufacturers generally avoid packaging components under atmospheric conditions, which was common practice in the past. An alternative is to package the component in foil, pull a vacuum on it or introduce a nitrogen/argon flush before irradiation sterilization. This eliminates most of the oxygen thereby reducing oxidation of the polymer during storage. Neither procedure completely solves the problem of reactive species generated by the effect of radiation on the polymers. These species can persist for years and react with the polymer and components thereof and packaged products during storage. This invention describes a process that reduces the oxidation and degradative reactions by scavenging the reactive species that are formed during irradiation and providing a relatively inert storage condition during post irradiation shelf life.

SUMMARY OF THE INVENTION

Irradiated polymeric components and methods of producing such are disclosed and described. A component which is comprised of a polymer is placed in a tight sealed container. The container also holds a chemical compound which acts as a scavenger for the reactive species generated during irradiation. Oxygen is removed from the container (e.g. by vacuum) and/or the container may be flushed with an inert gas. The component in the container is irradiated with a sufficient amount of radiation so as to sterilize, or accomplish any other desired process such as cross linking of the component and sterilize the inside of the container in which it is held. The vacuum and/or inert gas decreases oxidation of the component and the scavenger reduces reactions with the polymer thereby increasing the shelf life of the component. While the invention is described in detail in terms of sterilization using radiation, the invention may be practiced to draw advantages where radiation may be used for other applications such as cross linking of polymers. Furthermore, although the description refers to the use scavengers for reactive species such as HF and HCl, this invention may be practiced using scavengers for other reactive species formed during irradiation. Those familiar with the art of effects of radiation on polymers may identify the reactive species formed in their particular application and practice this invention with the use of appropriate scavengers.

The sterilized packaged components of the invention may be any component material comprised of a polymer. Examples of polymeric materials used for making the component are provided herein. The component may itself be a packaging material such as a component of a drug containing package which has strict sterilization requirements. The component may be contained within a sealed polymeric bag or outer package which bag or outer package is filled with an inert gas and contains the scavenger material. That bag may be contained within a second bag or container which is also sealed and filled with an inert gas. Additional bags or outer containers filled with inert gas and potentially containing a scavenger material may also be used.

An aspect of the invention is a polymer material component sterilized with radiation inside of a sealed container which sealed container also holds a hydrogen fluoride and/or hydrogen chloride scavenger.

Another aspect of the invention is that the polymer material is less subject to deterioration over time due to the inert storage environment created by the presence of the scavenger material.

Yet another aspect of the invention is a method whereby a polymer material is irradiated inside of a sealed container which has depleted oxygen content due to the use of vacuum and/or infusion of inert gas with the sealed container also holding a hydrogen fluoride and/or hydrogen chloride scavenger.

These and other objects, advantages, and features of the invention will become apparent to those persons skilled in the art upon reading the details of the sterilized component and method for making such as more fully described below.

DETAILED DESCRIPTION OF THE INVENTION

Before the present sterilized packaged component and method for making such are described, it is to be understood that this invention is not limited to particular component or method described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "an", and "the" include plural referents unless the context clearly dictates otherwise. Thus, for example, reference to "a polymeric component" includes a plurality of such components and reference to "the polymer" includes reference to one or more polymers and equivalents thereof known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

Invention in General

In a number of different industries including pharmaceuticals, food, semiconductors, and medical devices, various components are made of polymeric materials and those materials must be in a sterile form when used by a patient. For example, the pharmaceutical industry often uses polymeric materials to produce containers for drugs which drugs may be in any form including liquid, powder and tablet form. All types of foods may be present within containers and semiconductor components used in the production of computers and related electronic devices are often included within sealed, sterilized containers. Medical devices themselves such as implants and catheters may be comprised of polymeric materials and the polymers may be composed of polymeric subcomponents e.g laminates In all of these cases it may be essential that the polymeric component be sterilized prior to use. The sterilization process can be carried out in a number of different ways but is often carried out using some form of directed artificial radiation such as gamma radiation which is applied for a period of time and in sufficient amounts so as to render microorganisms non-viable e.g. kill bacteria.

After the polymeric component is produced the sterilization with irradiation may be carried out in a surrounding atmosphere which minimizes the adverse effects of reactants such as oxidation. For example, the polymeric component may be subjected to radiation in a reduced atmosphere environment and/or an environment which has been flushed with an inert gas in order to remove as much oxygen as possible. However, even when substantially all of the oxygen is removed the radiation may create other reactants such as acids which react with the polymeric material over time. The reactants produced can adversely effect the properties of the materials such as having adverse effects of the structural integrity of the polymeric component or subcompoents thereof. This is particularly undesirable when the sterilized polymeric component must be stored for relatively long periods of time prior to use. The present invention endeavors to substantially reduce the adverse effects of reactants created during the sterilization process.

The polymeric material may be placed in a reduced atmosphere environment and/or surrounded with inert gas for sterilization. The sterilization may be carried out in a conventional manner such as by subjecting the polymeric material to radiation with gamma rays. However, in accordance with the present invention the polymeric material is preferably irradiated inside of a sealed container. The container is preferably comprised of a material which is permeable to the radiation but impermeable with respect to oxygen from the outside and bacteria and the inert gas inside the container and which might recontaminate the polymeric component. In accordance with the invention the surrounding sealed container also includes a reactant scavenger which scavenger may be present on the surface of the polymeric component. The reactant scavenger may be any type of absorbent material such as aluminum oxide, sodium oxide, silicon dioxide and ferric oxide. Specific examples of such reactant scavengers and commercially available materials which can act as such reactant scavengers are disclosed here. Other materials which decrease the reactivity of compounds such as acids or bases with the polymer being protected will be known to those skilled in the art reading this disclosure and/or may later be developed.

The present invention involves both a method for sterilizing and storing a polymeric material and the packaged sterilized polymeric material obtained in accordance with that method. The method steps involve sealing a polymeric component inside a container which container also holds and inert gas and a reactant scavenger. The container holding the polymeric component is then subjected to sufficient amounts of radiation such as gamma radiation in order to render microorganisms such as bacteria contained within the container non-viable. The component within the container may then be stored for relatively long periods of time where the reactant scavenger is allowed to come into contact with reactants which may have been created on the surface of the polymeric component by the radiation or diffuse out from the bulk of the polymeric component.

The product of the invention is thus a packaged, sterilized polymeric component. The packaged component includes the polymeric component which is preferably surrounded by an inert gas and in the presence of a reactant scavenger which is preferably on the surface of the polymeric component. The polymeric component inert gas and reactant scavenger are all sealed within the container which container is impermeable to bacteria and the inert gas.

The reactant scavenger must, at some point, come into contact with the reactants in order to decrease their reactivity. This can be carried out in a number of different ways. For example, the reactant scavenger can be placed inside of packages which are comprised of gas impermeable walls, e.g. Tyvek™ material may be used to create containers in which components being sterilized are placed. The reactant scavenger may be placed on the surface of the polymeric component, may be embedded into the polymeric component or may be embedded into or onto the surface of the packaging material. In addition, the surface of the polymeric component being sterilized may be chemically treated so that it binds to the reactant scavenger. Any and all of these methods may be used alone or in combination with different types of reactant scavengers in different combinations.

The reactant scavengers may be antioxidants or oxygen absorbents which include Freshpax™ manufactured by Multisorb Technologies, N.Y.; Mitsubishi Ageless™ Oxygen Adsorbents, manufactured in Ontario, Canada; Hydrogen fluoride adsorbents include Activated Alumina such as A-202HF™ manufactured by UOP, Des Plaines, Ill.; DD-450™ manufactured by Alcoa World Chemicals; HF-200™ manufactured by Alcoa World Chemicals; Florocel™, Activated Alumina manufactured by Lawrence Industries in the United Kingdom; Fluorocel 830™, Porocel manufactured in Little Rock, Ark.; Actiguard HF™ manufactured by Alcan Chemicals, Tex.

Hydrogen Chloride adsorbents of various types are also commercially available and known to those skilled in the art. For example, it is possible to use Activated Alumina 9139A™ manufactured by UOP, Des Plaines, Ill.; CL-750™ manufactured by Alcoa World Chemicals; Selexsorb® HCl manufactured by Alcoa World Chemicals; Actiguard™ Cl manufactured by Alcan Chemicals, Tex.

Those skilled in the art will recognize the amounts of the different reactant scavengers which would be used based on the type of radiation, amount of radiation and polymer material being used. The amounts being used can be calculated based on the absorbent ability of the reaction scavenger being used and amount of reactant that would be expected to be generated.

With respect to hydrogen fluoride and hydrogen chloride scavengers it is possible to use 80 to 100 grams of the scavengers per 800 to 1200 feet of irradiated film (7–10 mil (thick)). For most commercially available catalyst, preferred loading of reactive species such as chloride and fluoride to volume of fresh catalyst is in the range of about 30–50 lbs/cubic feet.

With respect to oxygen scavengers there are commercially available oxygen scavengers which have known absorbent capacity. The volume of the sterilization chamber is known or can be calculated. Accordingly, the amount of the absorbents (reactant scavengers) can be readily determined. The calculation can be readily worked out by those skilled in the art knowing the chemical structure of the polymeric material and packaging materials used. The present invention can be carried out with greatly different amounts of reactant scavengers and obtain a desired result. However, in order to not waste product in terms of the amount of reactant scavengers and in order to have some assurances that all the reactants are being effected it is desirable to carry out some calculations. However, if too much or too little of the reactant species is included the invention remains useful.

It is pointed out that in a given application there are approximately 4 liters of air or 800 ml of oxygen in the container which become exposed to gamma radiation. Using oxygen scavengers with known absorbent capacities of about 1000 ml would result in the removal of all of the free oxygen present in the "headspace" of the container. This process could be performed in 1 to 2 days before exposure to radiation to ensure removal of all of the oxygen.

Definitions

The term "polymeric component" is used herein to describe any of a variety of types of polymer materials including polyolefins, polyvinyls, polyethers, polyesters, polyamides, polyurethanes and the like which may be used alone or in various combinations to create a component which can be molded into a structural form. Examples of polymeric components include, but are not limited to, containers for drugs, drug delivery device components, food containers, containers for semi-conductor components, medical device implants, and containers for medical devices. The polymeric material may be any type of polymer and is preferably a polymer which when subjected to a sterilization procedure such as sterilizing radiation generates a reactant such as an acid (e.g. HCL, and HF). The polymeric component may be and preferably is present in multiple copies so that several polymeric components including 10's or even 100's or 1000's of polymeric components may be present within the surrounding sealed container. The polymeric components are stored in the sealed container until they are introduced into a manufacturing process and/or are used directly by the patient.

The terms "irradiating" and "subjecting to radiation" and the like are used interchangeably herein and are intended to mean the use of man-made or artificial radiation such as gamma radiation, X-ray radiation, electron beam radiation and the like used for sufficient periods of time and/or in sufficient amounts so as to render microorganisms such as bacteria, parasites, viruses and fungus non-viable.

Irradiation is preferably used in the invention in order to carry out sterilization. The sterilization process preferably destroys all types of pathogens, e.g. microorganisms, bacteria, virus, and infectious proteins which might be present on the component being irradiated. The radiation may be any type of electromagnetic radiation which is an artificially generated radiation (not merely naturally occurring radiation from the sun or surrounding environment) and may be electromagnetic radiation such as UV, visible light, X-rays, Gamma rays, and electron beam radiation. Those skilled in the art will recognize various types and combinations of radiation which may be effectively used in order to carry out the desired sterilization process. The scavenger used may be any substance that can absorb or sequester another undesirable chemical species. The reactant species may be any species that by virtue of its chemical nature will react with other materials that it comes into contact with. Such species may be formed by the effect of the radiation or by the effective other chemical species on the material.

The methodology of the invention whereby a component is irradiated is preferably carried out in a vacuum or more specifically a reduced atmosphere environment. The vacuum may be created by physical means or by the use of a chemical oxygen absorbent. The environment may be subjected to vacuum and then filled with inert gas such as nitrogen or argon gas. Vacuum pumps can be used to create a vacuum in the range of 100 to 0.001 mTorr. The object of producing the vacuum and providing the inert gas is to remove as much reactive species such as oxygen gas from the environment as possible with consideration to practicalities and economic concerns.

Polymeric Materials

Those skilled in the art will recognize that a wide range of different polymeric materials can be used in producing the polymeric components and packaging materials to be treated in connection with the present invention. However, to provide further guidance the following list of materials is provided below.

| Polymer | Commercial name | Species Generated by irradiation | Commercial Product |
|---|---|---|---|
| PCTFE | Aclar ®<br>Neoflon ®<br>Kel-F ®<br>Chemfluor ®<br>Tecafluon<br>Voltalef ® ™<br>302<br>VapoShield ™ | F⁻, Cl⁻, O* | $O_2$: FreshPax, Ageless<br>F⁻:<br>A-202HF, DD-450, HF-200, Florocel, Fluorocel 830. Actiguard HF<br>Cl⁻:<br>9139A, CL-750, Selexsorb ® HCl, Actiguard Cl |
| ECTFE | Halar ™<br>Dyneon ™ | F⁻, Cl⁻, O* | $O_2$: FreshPax, Ageless<br>F⁻:<br>A-202HF, DD-450, HF-200, Florocel, Fluorocel 830. Actiguard HF<br>Cl⁻:<br>9139A, CL-750, Selexsorb ® HCl, Actiguard Cl |
| PVC | Geon ®<br>Viclon ®<br>Benvic ® | Cl⁻, O* | $O_2$: FreshPax, Ageless<br>Cl⁻:<br>9139A, CL-750, Selexsorb ® HCl, Actiguard Cl |
| PVDC | Saran ® | Cl⁻, O* | $O_2$: FreshPax, Ageless<br>Cl⁻:<br>9139A, CL-750, Selexsorb ® HCl, Actiguard Cl |

The term "reactant scavenger" is used herein to describe any material which reduces the reactivity of another component. Examples include oxygen absorbents and acid absorbents. Materials which prevent or reduce oxidation as well as prevent or reduce the effects of acid such as hydrogen chloride on the polymer are considered reactant scavengers.

The reactant scavengers are more generally defined above. However, to provide guidance to those skilled in the art examples of some useful reactant scavengers are provided below.

Oxygen Adsorbents:
1. Freshpax, Manufacturer: Multisorb Technologies, N.Y.
2. Mitsubishi Ageless Oxygen Adsorbents, Ont., Canada HF Adsorbents:
1. Activated Alumina A-202HF. UOP, Des Plaines, Ill.
2. DD-450. Alcoa World Chemicals.
3. HF-200. Alcoa World Chemicals.
4. Florocel, Activated Alumina. Lawrence Industries, UK
5. Fluorocel 830, Porocel, Little Rock, Ark.
6. Actiguard HF. Alcan Chemicals, Tex.

HCl Adsorbents:
1. Activated Alumina 9139A. UOP, Des Plaines, Ill.
2. CL-750. Alcoa World Chemicals.
3. Selexsorb® HCl Alcoa World Chemicals.
4. Actiguard Cl. Alcan Chemicals, Tex.

This invention describes an active packaging process to reduce the loss of physical properties of film laminates used in pharmaceutical, food, semiconductor and medical device packaging. An example of such a polymer film and its laminates are Aclam (Honeywell). Where the primary barrier film in the laminate is Aclar and the food, drug-contacting surface may be an olefin such as PE, PP, EMA, EVA or EAA. The packaging film could be formed using lamination adhesives.

It has been observed that sterilization of these materials using gamma or electron beam irradiation reduces physical properties such as peel strength of laminates, toughness, delamination frequency of blister packages and the post sterilization shelf life has a direct bearing on the results. As the films were kept in their sterilization containers beyond the first few weeks the peel strength of the laminates continued to reduce with time. Investigations have shown that irradiation of the laminates in these conditions releases HF, HCl and possibly other organic chlorofluorocarbons. These reactive species appear to play a major role in degradation of the laminate properties as long as the film is stored inside the original container. From a bioburden viewpoint it is not practical to remove the materials from the containers if the material is not scheduled for immediate use. It is conceivable that an "inert" process should allow the laminate to have a longer practical shelf life without a significant loss of physical properties.

It was discovered that a two-pronged approach can be used to solve this problem;

1. First an inert environment was created to reduce the number of free radicals formed during gamma irradiation of this material. This was done by sealing the sterilization pouches that contain rolls of laminate film (multiple interconnected polymeric components) under a nitrogen flush and/or by adding oxygen-adsorbing packets (Freshpax, Multisorb Corp, N.Y.) with a known capacity for adsorbing oxygen.

2. HF and HCl adsorbents (A-202HF & 9139A UOP, Ill.) were added to the sterilization pouch to scavenge the reactive species (F⁻ & Cl⁻) that are formed inside the package post-irradiation of the polychlorotrifluoropolymer, Aclar.

The results of the investigation showed that the laminate film irradiated using gamma to 25–40 kGy using the inert process exhibited a significantly less drop in peel strength as compared to the control (film irradiated in air). While the peel strength of the control dropped significantly beyond a post gamma shelf life of 3 weeks, no such reduction was seen in the "inert" group up to 12 weeks of post gamma shelf life. Other tests such as rupture and delamination frequency of blisters formed using these materials also confirmed the findings of the study. The findings could be summarized as follows:

1. Inert environment reduces impact of gamma irradiation without affecting sterility of product.
2. HF/HCl scavengers effectively reduced damage caused inside sealed sterilization pouches.
3. The overall result is reduced loss of desirable properties and significant increase in shelf life.

Definition of Problem:

Radiation sterilization of polymer-based materials causes chemical changes in the polymer that are accompanied by immediate changes in physical properties such as embrittlement and/or stiffening and discoloration in many instances. Peroxides are formed that break down with time and thus the polymer continues to change its properties during its shelf life, long after radiation has ceased.

Those skilled in the art will recognize that it is important to maintain desirable physical properties with respect to materials and packaging being irradiated. Those properties include properties such as the tensile strength, ultimate elongation, toughness, modulus, and peel strength of laminates. In addition, characteristics such as odor, discoloration and corrosion or materials need to be taken into consideration when carrying out the processing of the present invention. It is preferable to minimize changes in these characteristics. If changes in some or all of these characteristics change too much the component will not be useful. However, changes of ±25% or less, preferably ±10% or less or more preferably ±5% or less may be caused by the sterilization and storage procedures that may be used with the invention. The reduction in changes may be over long periods, e.g. 3 days or more, 7 days or more, 30 days or more or 1 year or more.

The plastic composition used in such containers typically includes a plastic resin that is suitable for contact with blood, such as polyvinyl chloride, polyolefin or polyester. The plastic composition may also include additives, for example, to stabilize the plastic composition during processing or during sterilization of the container, which may, at times, be carried out at high temperatures.

Unfortunately, exposure of certain plastic compositions to high temperatures, such as during extrusion of the plastic composition and/or during steam sterilization, may occasionally cause degradation of the plastic composition. Degradation, which is believed to be associated with a molecular breakdown of the polymer resins and other materials, may result in a weakening of the overall mechanical strength of the container. More particularly, degradation may result in a weakening of the peripheral seals and a reduction in the impact strength (i.e. ability of the container to withstand impact). Moreover, exposure to heat and/or even extended exposure to less severe environments may also cause undesirable and aesthetically unacceptable discoloration (e.g. yellowing) of the plastic material.

To prevent or reduce degradation and/or discoloration, inclusion of a small amount of certain additives can help stabilize the plastic material during high temperature heating and during exposure to certain other environments. As reported in U.S. Pat. No. 4,280,497, which is incorporated by reference herein, epoxodized oils, such as epodixidized soy been oil and epoxodized linseed oil may be used as heat stabilizers. Also, as reported in Laermer et al. "Use of Biological Antioxidants as Propylene stabilizers", Plastics and Rubber Processing and Applicants 14 (1990) 235–239 and Laermer et al. "Alpha-Tocopherol (Vitamin E)—The Natural Antioxidant for Polyolefins" Journal of Plastic Film and Sheeting, Vol. 8, July 1992 (both of which are also incorporated by reference), Vitamin E (which is a mixture of tocopherols and tocotrienols) is an antioxidant that can serve as a stabilizer during extrusion of polyolefins. Vitamin E as an antioxidant is preferred because, as reported in the 1992 article by Laermer, it is non-toxic and is "generally regarded as safe" (GRAS) by the FDA.

For example, the present invention is directed, in part, to a plastic or polymeric composition that includes a plastic resin, Vitamin E and plasticizer. In one aspect of the present invention, the plastic or polymeric resin may be polyvinyl chloride ("PVC"), while in another aspect of the present invention, the plastic resin may be a non-PVC such as polyolefin. (U.S. Pat. No. 6,468,258 Plastic compositions including vitamin E for medical containers and methods for providing such compositions and containers)

In an effort to determine the cause of accelerated wear rates and premature component failures, studies have been conducted on material variables involved in component fabrication and utilization. Deformation and loosening of implants bought on by excessive wear rates has been correlated to .gamma.-irradiation sterilization in air causing chain scission, which lowers the wear resistance and accelerates the degradation process.

Sterilization by .gamma.-irradiation has been the method of choice for implants since about 1980. However, .gamma.-sterilization generates free radicals, which react in the presence of oxygen to almost exclusively form peroxyl radicals.

These free radicals and peroxyl radicals react with PE chains and each other to form oxidative degradation products and additional radical species. This cycle of oxidation product and radical species formation has been shown to occur over several years as oxidation levels continuously increase in components over this time period. The resulting formation of chain scission products creates shorter molecular chains, degrading the mechanical properties and performance of UHMWPE implants. Furthermore, the damage caused by .gamma.-irradiation does not require the implant to be exposed to levels of stress found in use. Instead, oxidative degradation of .gamma.-irradiated components may occur during storage prior to implantation.

In U.S. Pat. No. 5,827,904 a composition for the manufacture of medical implants is shown, which consists of a polymeric material in powder form and a carotenoid doped into the polymer to produce a oxidation-resistant matrix for forming the implant. In the doping process the carotenoid is dissolved solved in an organic solvent, such as 2-propanol, cyclohexane, n-hexane, benzene, and the like.

The object of the present invention is to provide an improved method for the addition of an antioxidant to UHMWPE in order to obtain a homogenous mixture of ultra high molecular weight polyethylene and an antioxidant.

The purpose of adding an antioxidant to UHMWPE is to reduce oxidation of the polymer during sterilization and post sterilization and thereby decrease the wear of the implant in the body. Sterilization with .gamma.-radiation induces free radicals in the material and these radicals react with oxygen to produce peroxy radicals which attack the polymer chains. Chain scission drastically reduce the wear resistance of the polymer, for example, by lowering the molecular weight. Natural antioxidants can react with radiation induced free radicals in the polymer thereby terminating the chain scission process and in this way reduce the oxidation of the polymer. Examples of antioxidants which can be used in the method according to the invention include .alpha.- and .delta.-tocopherol; propyl, octyl, or dodecyl gallates; lactic, citric, and tartaric acids and their salts; as well as ortho-phosphates. A useful antioxidant may be vitamin E.

UHMWPE doped with an antioxidant by the method of the invention has excellent properties for the manufacturing of implants, especially joint prostheses. The UHMWPE powder doped with antioxidant is compression molded either directly into implants or into blocks, from which implants are produced by mechanical processing, e g turning, etc. Finally, the implant having excellent wear resistance and markedly reduced degradation in the body are packaged and sterilized.

In order to further improve the wear resistance of UHMWPE or the implants, the antioxidant doped UHMWPE material may be subjected to gamma.- or .beta.-radiation at a dose above 2 Mrad, preferably above 9 Mrad, followed by annealing (remelting), i e subjecting the UHMWPE particles or the implant to an elevated temperature, preferably above 80 C when vitamin E is used. This procedure results in an increased crosslinking of the polymer, thereby enhancing the wear resistance thereof. This radiation/remelting treatment can be carried out at any stage in the manufacturing process; from powder to implant.

Reactant Scavengers

A wide range of different materials may be used for their effect on reducing oxidation and/or reactions with various acids created during the sterilization process. However, it is believed that there are a number of commercially available materials which could be readily included within the sealed container holding the polymeric component. Some examples of these materials which would be considered to be reactant scavengers are provided below.

The following reactant scavengers are specifically useful as hydrogen fluoride absorbents.

1. Activated Alumina A-202HF
Manufacturer: UOP, Des Plaines, Ill.
Ingredients:
Aluminum oxide ($Al_2O_3$, non-fibrous)<95%
Water<10%
2. DD-450
Manufacturer: Alcoa World Chemicals
Ingredients:
Aluminum oxide ($Al_2O_3$)<92.5%
Sodium oxide ($Na_2O$)<0.35%
Silicon Dioxide ($SiO_2$)<0.015%
3. HF-200
Manufacturer: Alcoa World Chemicals
Ingredients:
Aluminum oxide ($Al_2O_3$)<94.9%
Sodium oxide ($Na_2O$)<0.02%
Ferric oxide ($Fe_2O_3$)<0.02%
Silicon Dioxide ($SiO_2$)<0.3%
4. Florocel, Activated Alumina
Manufacturer: Lawrence Industries, UK
5. Fluorocel 830,
Manufacturer: Porocel, Ark.
Ingredients:
Aluminum oxide ($Al_2O_3$)+Promoter<99.6%
Sodium oxide ($Na_2O$)<0.36%
Silicon Dioxide ($SiO_2$)<0.015%
6. Actiguard HF
Manufacturer: Alcan Chemicals, Tex. & CO
Ingredients:
Aluminum oxide ($Al_2O_3$)<94.9%
Sodium oxide ($Na_2O$)<0.45%
Ferric oxide ($Fe_2O_3$)<0.015%
Silicon Dioxide ($SiO_2$)<0.02%

In addition to the materials listed above other commercially available materials which might be particularly useful as hydrogen chloride absorbents may also be included. It is noted that there is some overlap with respect to the composition of these different reactant scavengers. More specifically, there is some overlap such as the inclusion of aluminum oxide in the hydrogen chloride absorbents with aluminum oxide also being present in the hydrogen fluoride absorbents.

1. Activated alumina 9139A
   Manufacturer: UOP, Des Plaines, Ill.
   Ingredients:
   Aluminum oxide ($Al_2O_3$, non-fibrous)<95%
   Sodium oxide ($Na_2O$)<10%
   Water<10%
2. CL-750
Manufacturer: Alcoa World Chemicals
Ingredients:
Aluminum oxide ($Al_2O_3$)+Surface Modifier<95%
Sodium oxide ($Na_2O$)<0.37%
Silicon Dioxide ($SiO_2$)<0.015%
3. Selexsorb® HCl
Manufacturer: Alcoa World Chemicals
Ingredients:
Aluminum oxide ($Al_2O_3$)+Surface Modifier<95.1%
Sodium oxide ($Na_2O$)<0.3%
Silicon Dioxide ($SiO_2$)<0.02%
Ferric oxide ($Fe_2O_3$)<0.02%

Another form of the reactant scavenger is an oxygen absorbent. Although there are a large number of different possible oxygen absorbents the following commercially available materials might be found to be particularly useful in connection with the present invention.

3. Freshpax
   Manufacturer: Multisorb Technologies, N.Y.
   Ingredients:
   Iron Powder (50–60%)
   Amorphous Silica (15–25%)
   Water & NaCl (20–30%)
4. Mitsubishi Ageless Oxygen Adsorbents
   Ingredients:
   Iron Powder While the use of oxygen scavengers has been reported elsewhere in the literature, the novel teaching of this invention include using scavengers for the specific reactive species generated by irradiation of the polymer under consideration. Many of the scavengers described above may absorb other species than HF, HCl and oxygen and therefore may be utilized for practicing this invention by absorbing those species if generated during irradiation. Furthermore, this invention also teaches the art of combining the advantages of oxygen scavenging previously known, with advantages of scavenger the reactive species formed during irradiation as taught herein.

Composition of Polymeric Components

A wide range of different polymeric materials may be used in producing the polymeric components of the invention. In general, these materials are widely known by those skilled in the art.

Typical examples of the polyolefin which can be used to form the oxygen absorbing layer 2 include polyethylenes such as low-density polyethylenes, straight-chain low-density polyethylenes, medium-density polyethylenes, high-density polyethylenes and metallocene polyethylenes (and copolymers), polypropylenes such as polypropylene, propylene-ethylene random copolymers, propylene-ethylene block copolymers and metallocene polypropylenes (and copolymers), polyolefins such as polymethylpentene (and copolymers), elastomers such as ethylene-propylene rubbers, ethylene-vinyl acetate copolymers and mixtures thereof. In the case where the oxygen absorbing packaging container is subjected to a retort treatment or a high retort treatment, the polyolefin to be used in the oxygen absorbing layer 2 has preferably a melting point of 135.degree. C. or higher. With regard to a combination of the resins which can be used to form the oxygen permeating layer 1 and the oxygen absorbing layer 2, it is preferable to select the same resin or different kinds of resins which are compatible with each other and which can thermally fuse each other.

Specific Embodiments

Figure 1:
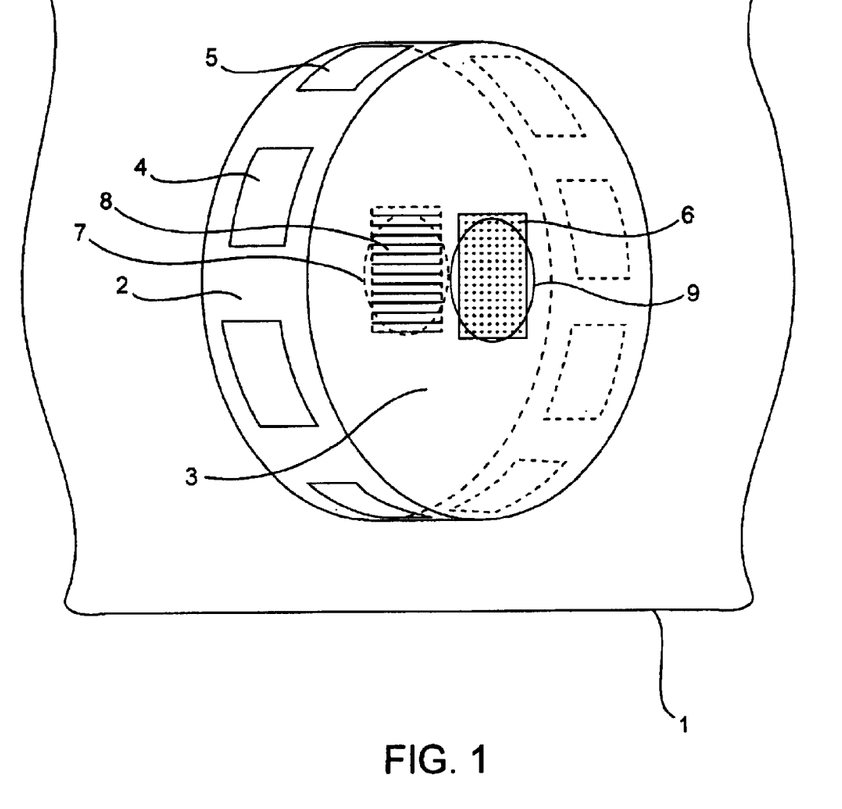
FIG. 1 is a schematic, perspective view of packaged polymer components having packets of reactant scavenger attached to their surface.

FIG. 1 is a schematic view of the embodiments of the invention. Specifically, FIG. 1 shows an outer package 1 which may be in the form of a plastic bag comprised of one or more polymer materials which materials are substantially impermeable to inert gas which may be present inside the package 1 and contaminants which may be present outside the package 1. The package holds the polymer component 2 which here is in the form of laminated film (100–1500 ft) mounted on a plastic spool. The polymer component in the form of a tape 2 may be wound around the polymer spool 3. The spool 3 includes oval shaped openings 7 and 9. Single or multiple openings of any shape may be used. The roll of film may be in the form of a plurality of separate components or subcomponents. The components may be polymeric containers for pharmaceuticals. The components may be used as nozzles for aerosolized delivery of drugs. Examples of containers and nozzles are disclosed and described in U.S. Pat. Nos. 5,709,202; 5,497,763; 5,544,646; 5,718,222; and 6,123,068 and related patents all of which are incorporated herein by reference in their entirety and to disclose container and nozzle components specifically.

In one embodiment the polymer component 2 has a plurality of packets such as the packets 4 and 5 attached to its surface. The packets 4 and 5 can contain one or more reactant scavengers such as aluminum oxide, sodium oxide, silicon dioxide, ferric oxide and the like. The purpose of the reactant scavengers is to render non-reactive components such as hydrogen chloride, hydrogen fluoride and oxygen. The reactant scavengers can be embedded into the polymer component 2 or embedded into various components of the polymer component 2 which components may be one or more subcomponents which are smaller than the overall component 2.

Packets of reactant absorbents such as oxygen adsorbent packages 6 and 8 are placed in this position for convenience near the holes 7 and 9 but in practicality they could be placed anywhere inside the container 1. Individual polymer components such as the polymer component may be present by themselves or present in the package 1 along with the larger polymeric component 2.

It will be understood by those skilled in the art that the polymer components may have adhesives thereon and may be in any size or shape and further that the polymer component may be comprised of one, two, or a plurality of different polymers so as to obtain the desired result.

The package 1 containing the polymer components such as the polymer component 2 can be placed in additional packages or placed in the box and shipped for sterilizing radiation. Accordingly, the package 1 must be comprised of a material which can be permeated by the sterilizing radiation. Further, the material making up the package 1 preferably has sufficient structural integrity that it does not break during shipping to the point where it is sterilized or break in return shipment or during storage.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

Example 1

A blister film laminate comprising of polychlorotrifluoroethylene (PCTFE) and ethylene acrylic acid (EAA) was tested by exposure to gamma irradiation dose of 25–35 kGy in air and by using an inert environment and a HF, HCl scavenger-based process. Irradiation of such laminate stuctures results in formation of $F^-$ & $Cl^-$ based reactive species that continue to degrade the film stored inside a sealed container during post-irradiation shelf life.

The sterilization packages was made by placing the roll of blister film laminate (300–1200 ft) mounted on a reel in three polyethylene bags (20'×20') and then heat-sealing all three bags. In the control condition no scavengers were placed and the environment inside the triple-bagged package was ambient. The inert environment for gamma processing was created by using oxygen and HF/HCl adsorbents as follows:

Oxygen Adsorbent:
Freshpax Type D-500. Manufacturer: Multisorb Technologies, N.Y. Each packet is capable of adsorbing 500 cc of oxygen. Two of these packets were used to irradiate 1000 ft of film and the two packets were taped to the side of the reel that contained the roll of film.

HF & HCl Adsorbents:
HF:Activated Alumina A-202HF. Manufacturer: UOP, Des Plaines, Ill.
HCl: Activated alumina 9139A. Manufacturer: UOP, Des Plaines, Ill.

Approx. 10±/–2 g of these adsorbents was placed in VWR brand Critical Cover Tyvek Sterility Pouches (2 in.×3 in.) and heat-sealed. The pouches were taped circumferentially around the roll of blister film in alternating fashion. The number of packages used depended on size of the roll and for 800–1200 ft rolls eight (four each) pouches were used.

Nitrogen Flush:
In some cases a nitrogen flush was also used in the innermost bag along with the scavengers before sealing the package.

These sterilization packages were sent for gamma irradiation to Sterigenics, Hayward, Calif., where they were irradiated to a dose range of 25–35 kGy. After returning from the sterlization facility the rolls were opened on predetermined days representing varying post gamma shelf lives from 3–12 weeks. The films were then tested for physical properties such as tensile strength, toughness and peel strength in dry and water-immersed conditions. It was found that the inert scavenger-based process reduced changes in physical properties relative to the same process without the reactant scavengers. Specifically, it was found that the invention reduced loss of tensile strength by 15–20%, toughness by 30–40% and peel strength by 60–70% relative to a process without reactant scavengers. One of the most significant observations was that adverse effects of the delamination rate of the film in various stability conditions improved significantly as compared to the process without scavengers. It was concluded that the new process could be used to increase the post-irradiated shelf life of these raw materials by a significant length of time with a significant decrease in the loss of physical properties relative to a process without reactant scavengers.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. A method, comprising the steps of:
   sealing a halogenated polymer component, an inert gas and reactant scavenger into a container impermeable to bacteria and the inert gas;
   irradiating the polymer component and the container with radiation; and
   storing the container in a manner such that the reactant scavenger in the container is allowed to contact reactants formed during irradiation.

2. The method of claim 1, wherein the halogenated polymer component comprises a film laminate of polychlorotrifluoroethylene (PCTFE) and ethylene acrylic acid (EAA).

3. The method of claim 1, wherein the reactant scavenger is activated alumina.

4. The method of claim 1, wherein the halogenated polymer chosen from PTFE, PCTFE, PVDF and PVC.

5. The method of claim 1, wherein the reactant scavenger is chosen from aluminum oxide, sodium oxide, silicon dioxide and ferric oxide.

6. The method of claim 1, wherein the inert gas is chosen from nitrogen, argon, helium, neon, xenon, and krypton.

7. The method of claim 1, wherein the radiation is chosen from gamma irradiation, x-ray irradiation, ultraviolet (UV) irradiation and electron beam irradiation and the storing is over a period of three days or more.

8. The method of claim 1, wherein artificially created radiation is chosen from gamma radiation, X-rays, UV, and e-beam radiation for sterilization purposes in an amount in a range of from about 25 to about 35 kGy and the storing is over a period of seven days of more.

9. The method of claim 1, wherein the reactants are chosen from HCl, HF, HBr and HI and the storing is over a period of thirty days or more.

10. The method of claim 1, wherein the reactant scavenger comprises an acid adsorbent and physical properties of the polymer component are stabilized in a range of ±25% over a period of thirty days.

11. The method of claim 1, wherein the container is stored for one week or more following the irradiating.

12. A packaged, sterilized polymeric component, comprising a halogenated polymer component;

an inert gas;

a reactant scavenger; and a sealed container holding the polymeric component, inert gas and reactant scavenger, the sealed container being impermeable to bacteria and the inert gas.

13. The packaged, sterilized polymeric component of claim 12, wherein the halogenated polymer component comprises a film laminate of polychlorotrifluoroethylene (PCTFE) and ethylene acrylic acid (EAA).

14. The packaged, sterilized polymeric component of claim 12, wherein the reactant scavenger is activated alumina.

15. The packaged, sterilized polymeric component of claim 12, wherein the halogenated polymer is chosen from PTFE, PCTFE, PVDF and PVC.

16. The packaged, sterilized polymeric component of claim 12, wherein the reactant scavenger is chosen from aluminum oxide, sodium oxide, silicon dioxide and ferric oxide.

17. The packaged, sterilized polymeric component of claim 12, wherein the inert gas is chosen from nitrogen, argon, helium, neon, xenon, and krypton.

18. The packaged, sterilized polymeric component of claim 12, wherein the halogenated polymer component is comprised of a plurality of different polymers.

19. The packaged, sterilized polymeric component of claim 12, wherein the halogenated polymer component is comprised of an adhesive.

20. The packaged, sterilized polymeric component of claim 12, wherein the reactant scavenger is in one or more packets attached to the halogenated polymer component.

21. The packaged, sterilized polymeric component of claim 12, wherein the reactant scavenger is embedded in the halogenated polymer component.

22. The packaged, sterilized polymeric component of claim 12, wherein the halogenated polymer component is comprised of a main component and a smaller subcomponent which has embedded therein the reactant scavenger.

* * * * *

UNITED STATES PATENT AND TRADEMARK OFFICE
CERTIFICATE OF CORRECTION

PATENT NO.   : 6,933,026 B2
DATED        : August 23, 2005
INVENTOR(S)  : Mauze, Ganapati et al.

It is certified that error appears in the above-identified patent and that said Letters Patent is hereby corrected as shown below:

Title page,
Item [73], Assignee, should read -- Aradigm Corporation --.

Signed and Sealed this

Fourteenth Day of February, 2006

JON W. DUDAS
*Director of the United States Patent and Trademark Office*